US00RE38264E

(19) United States
(12) Reissued Patent
Hans

(10) Patent Number: US RE38,264 E
(45) Date of Reissued Patent: Oct. 7, 2003

(54) ROTARY DRIVE FOR A DATA CARRIER

(75) Inventor: Helmut Hans, St. Georgen (DE)

(73) Assignee: Papst Licensing GmbH & Co. KG, Spaichingen (DE)

( * ) Notice: This patent is subject to a terminal disclaimer.

(21) Appl. No.: 09/421,000

(22) Filed: Mar. 26, 1997

Related U.S. Patent Documents

Reissue of:
(64) Patent No.: 5,317,241
Issued: May 31, 1994
Appl. No.: 07/671,454
Filed: Mar. 19, 1991

U.S. Applications:

(63) Continuation of application No. 07/126,600, filed on Nov. 30, 1987, now abandoned.

(30) Foreign Application Priority Data

Nov. 29, 1986 (DE) ..... 3640907

(51) Int. Cl.[7] ..... H02P 7/00
(52) U.S. Cl. ..... 318/254; 318/249
(58) Field of Search ..... 318/567, 575, 318/601, 572, 254, 439, 138, 640, 561, 652, 53, 55, 57, 66, 268, 270, 271, 420, 373; 322/803, 933, 801; 369/12, 47, 48, 32, 33, 44.11, 44.26, 271; 360/69, 72.2, 73.01, 73.03, 73.08, 73.05, 73.14, 77.08, 77.12, 78.13, 78.04

(56) References Cited

U.S. PATENT DOCUMENTS

| | | | |
|---|---|---|---|
| 3,839,734 | A | 10/1974 | George et al. |
| 4,054,931 | A | 10/1977 | Bolton et al. |
| 4,092,687 | A | 5/1978 | Butsch |
| 4,147,299 | A | 4/1979 | Freeman |
| 4,249,221 | A | 2/1981 | Cox et al. |
| 4,367,502 | A | 1/1983 | Iftikar et al. |
| 4,412,261 | A | 10/1983 | Tateyama et al. |
| 4,418,369 | A | 11/1983 | Applequist et al. |
| 4,438,542 | A | 3/1984 | Schuh |
| 4,456,934 | A | 6/1984 | Wedman et al. |
| 4,460,857 | A | 7/1984 | Michaelis |
| 4,472,666 | A | 9/1984 | Akeda et al. |
| 4,538,193 | A | 8/1985 | Dimmick et al. |
| RE32,075 | E | 1/1986 | Harrison et al. |
| 4,594,626 | A | 6/1986 | Frangesh |
| 4,639,863 | A | 1/1987 | Harrison et al. |

(List continued on next page.)

FOREIGN PATENT DOCUMENTS

| | | |
|---|---|---|
| EP | 0 179 484 | 4/1986 |
| EP | 0462729 A2 | 12/1991 |
| GB | 1331759 | 9/1973 |
| GB | 2117144 A | 10/1983 |
| JP | 58 218886 | 12/1983 |

OTHER PUBLICATIONS

A. Ralston et al., "Hard Disk," Encyclopedia of Computer Science, Third Edition, pp. 595–597.

IBM Technical Disclosure Bulletin, vol. 27, No. 1B, Jun. 1984.

IBM Technical Disclosure Bulletin, vol. 26, No. 1, Jun. 1983.

*Primary Examiner*—Jonathan Salata
(74) *Attorney, Agent, or Firm*—Finnegan, Henderson, Farabow, Garrett & Dunner, LLP

(57) ABSTRACT

A data medium is driven by a brushless direct current more, and possesses control signals en a track which can be picked up by a sensing device and supplied to a switch arrangement for activation of the motor winding. The control signals on the track characterize at least those angular positions of the rotor with respect to the stator in which commutation is to be initiated.

18 Claims, 4 Drawing Sheets

U.S. PATENT DOCUMENTS

| | | | |
|---|---|---|---|
| 4,672,274 | A | 6/1987 | Suganuma |
| 4,684,861 | A | 8/1987 | Kawamura et al. |
| 4,691,154 | A | 9/1987 | Sato et al. |
| 4,751,441 | A | 6/1988 | Lewis |
| 4,772,835 | A | 9/1988 | Weaver et al. |
| 4,779,260 | A | 10/1988 | Kaneko et al. |
| 4,792,870 | A | 12/1988 | Pinson |
| 4,812,726 | A | 3/1989 | Benii et al. |
| 4,876,491 | A | 10/1989 | Squires et al. |
| 4,979,055 | A | 12/1990 | Squires et al. |
| 4,979,062 | A | 12/1990 | Stefansky et al. |
| 5,025,337 | A | 6/1991 | Brooks |
| 5,029,026 | A | 7/1991 | Stefansky et al. |

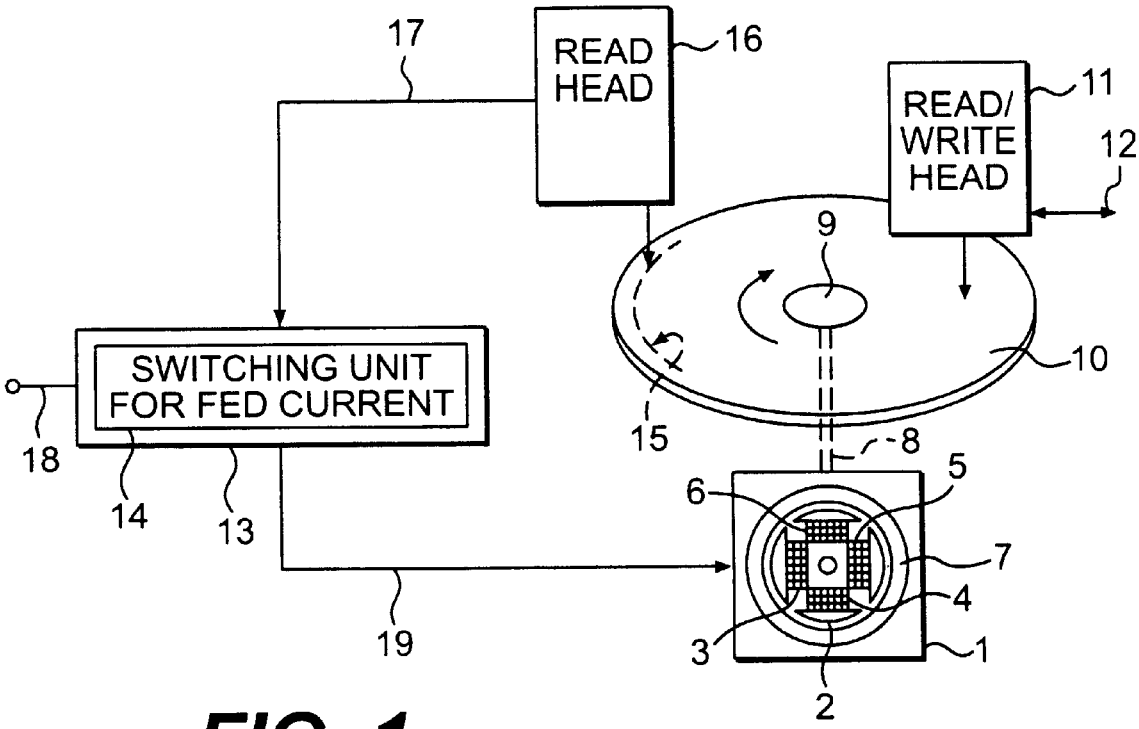
FIG. 1
(AMENDED)

ROTARY DRIVE FOR A DATA CARRIER

Matter enclosed in heavy brackets [ ] appears in the original patent but forms no part of this reissue specification; matter printed in italics indicates the additions made by reissue.

This application *is a divisional reissue application No. 08/818,587, filed Mar. 26, 1997, now U.S. Pat. No. Re. 37,825, which is a reissue application of application Ser. No. 07/671,454, filed Mar. 19 ,1991, now U.S. Pat. No. 5,317, 241, which* is a continuation application of Ser. No. 07/126, 600 filed Nov. 30, 1987 now abandoned.

BACKGROUND OF THE INVENTION

The invention concerns rotation-impairing drive unit for rotating a data carrier having a brushless d.c. motor with a permanent-magnet rotor, and a stator having a winding, the winding being formed by one or plural winding coils, a circuit arrangement for controlling the energization of the winding to generate a magnetic field effecting rotary motion of the rotor, and also a reading arrangement for reading signals recorded on the data carrier.

For driving daft carriers such as computer data-storage planers use is generally made of a brushless d.c. motor, with a data-carrier-receiving hub preferably being secured directly a the motor's shaft, so that the data carrier be directly driven. In order to assure a reliable, error-free reading of the data signals despite high daft recording density, it is necessary to drive the data carrier at a high speed that is uniform; for this purpose, as exact as possible a switchover (commutation of the current fed to the d.c. motor's stator-winding coils is necessary. For this purpose, known d.c. motors have one or plural sensors (e.g. Hall elements) inside the motor, housing in the immediate vicinity of the region of the rotor's magnetic influence, and these are caused to issue signals as a result of the alternation of the magnet field during rotor rotation. A circuit board likewise arranged in the motor housing carries the components of a circuit, to which the sensor output signals are fed, and by means of which commutation of the current for the winding is performed in correspondence thereto.

With drive units for data carriers, a further requirement is that their structural height be as low as possible and this, in the case of d.c. motors of the direct-drive type, basically meaning the axial length or the motor's structure. A manufacturer of such motors therefore must make every effort and adopt every reasonable expedient that would serve to reduce axial height. In addition, there is for the motor manufacturer the always present goal, to be able to make and sell the motor at low cost.

SUMMARY OF THE INVENTION

An object of the invention isto more advantageously design, and also simplify the construction of, data-carrier-rotating drive units of the type incorporating a brushless d.c. motor, while simultaneously achieving improved commutation of the motor winding.

In accordance with the invention this object is achieved as follows: the output of the reading arrangement is connected with the circuit arrangement that controls the amortization of the stator winding; and the data carrier has control signals which characterize at least those angular positions of the rotor relative to the stator at which the switchover (commutation) of the current fed to the winding coils is to be initiated.

Further particulars of the invention may be had from the description of several exemplary embodiments.

The advantage of the invention resides in particular in the fact that, by using components that are anyway present in a data-storage unit of the type here in question, one can entirely eliminate the sensor structure that in prior art was conventionally provided internal to the motor, and can furthermore eliminate the associated circuitry and circuit board. As there no longer needed components were arranged in the motor housing at an axial end thereof, it becomes possible to shorten the axial length of the motor correspondingly. At the same time, one eliminates problems associated with the need to connect inside the motor housing, a perhaps rather high number of coil ends to a circuit. Further, there no longer arises the particularly critical problem of the heating up of electronic components within the interior of the motor housing, which is closed and heats up as a result of the heating-up of the winding.

The to the relatively large data carrier diameter and high resolution or the recorded signals, very exact angular positioning of the commutation-control signals can be realized. Also, and without added cost, plural signals can be provided for each time of switchover in the supply of current to the winding, so that e.g. speed-regulating units effective during small amounts of angular motion can be provided, such that immediate corrective adjustment of the supply of energizing current to the winding become possible. Such speed-regulating units, when used in conjunction with sets of desired-speed data, make possible the implementation of speed profiles, for example acceleration and deceleration profiles.

Exemplary embodiments of the invention was illustrated in the drawings and are described in greater detail below.

BRIEF DESCRIPTION OF THE DRAWINGS

FIG. 1 illustrates principles of the invention;

DESCRIPTION OF THE PREFERRED EMBODIMENTS

Figure 2:
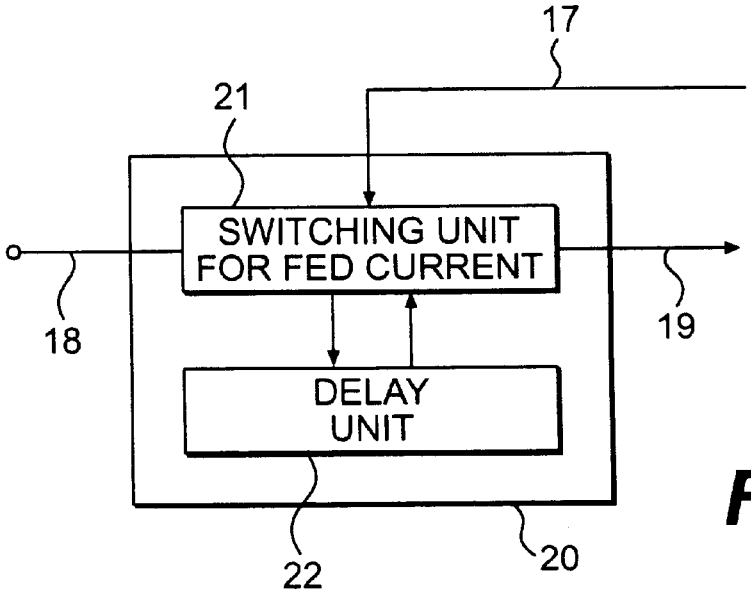
FIG. 2 depicts a variant of the circuit configuration shown in FIG. 1.

FIG. 1 depicts the principles of an exemplary embodiment having an external-rotor brushless d.c. motor 1. The four-pole stator 2 is provided with a winding made up of four coils 3–6 and is, in a known fashion, encircled by a permanent-coils magnet rotor 7.

For the sake of a simple illustration of inventive principles there is shown a external-rotor d.c. motor having an annular air gap; self-evidently, however, one can use any other motor type that would be suitable, in the sense of reduced axial length, a disk-rotor motor having a planar air gap being also preferred.

Rigidly connected to shaft 9 of motor 1 is a hub 9 on which a data carrier 10 is arranged. The data carrier 10 is constituted by a rigid or flexible computer data-storage platter carrying data signals a concentric trade. A write/read head 11 is arranged to be movable in radial direction war the data carrier 10; by means of head 11 data signals a the concentric tracks of data carrier 10 can be written, read, or erased. In known manner via a connection here shown as line 12, these signals are transmitted from a non-illustrated processing unit to the write/read head 11 or, as the case may be, are transmitted from the head to the preceding unit.

Depending on the type of time carrier 10 or, as the came may be, depending upon the employed data storage method, the read/write head 11 may comprise a magnetic head, an optical device, a laser head or a device for some other read/write principle. The orientation of the read/write head 11 relative to the concentric data signal trade can be such that, instead of a radial shifting occurring, even a tilting motion takes place.

In order to produce a magnetic field that effects rotary movement of the rotor, the coils 3 to 6 of the rotor winding must be energized by current in a certain succession, for example one after the other in the sequence of their arrangement. Here, note should be taken that the expression "winding coils" is also to be understood to apply to the special case of a stator having only one coil which is energized by current pulses in dependence upon rotor position, being marginal either by current pulses all of which have the same direction of flow, or else being energized by current pulses each successive one of which has a direction of flow opposite to that of the preceding current pulse; however, an arbitrary number of separately energizable coils, all belonging to the stator winding, likewise falls under this expression. The switching-on and switching-off of the energizing current flowing to the winding, on as the case may be the switchovers in the feeding of energizing current to the winding coils 3–6 (commutation) is controlled by a circuit unit 13, which in the exemplary embodiment of FIG. 1 essentially contains a switching unit 14 for the fed current.

Control signals for the switchover of the winding's energizing current are recorded on a radially outward concentric storage track 15 of data carrier 10, the latter being red by [a] read head 16 that corresponds to the write/read head 11 for the data signals. Control signals read by read head 16 are transmitted via a connection shown as conductor 17 to the circuit unit 13, whose switching arrangement 14 for fed current switches the operating current over from the energized one of the winding coils 3–6 to the winding coil that is to follow next in the energization sequence. In the simplest case, for each angular position at which a switchover is to occur, there is recorded on the storage track 15 a single control signal; after sensing each signal the circuit unit 13, i.e., its switching unit 14 for fed current, switches off the supply of current for the energized coil and switches on the supply of current for the next-following coil. In order to avoid a damaging overlap of electrical or magnetic effects, it is frequently advantageous to enforce a pause between the switching-off and renewed switching-on of the fed current; for this reason, for each angular position at which a commutation is to occur, advantageously two control signals can be arranged on the storage track 15 with definite spacing relative to each other. The reading of the first control signal that pertains to an angular position at which a commutation is to occur then causes the switching unit 14 for fed current to interrupt the supply of current to the presently energized winding coils of the motor winding along a connection here shown an line 19, whereas the reading of the second control signal effects establishment of current feed to the winding coils 3–6 that are next in the energization sequence. The spacing of the [con] *control* signals that are provided on the data carrier for each angular position at which a commutation is to occur accordingly determines the length of the energizing-current pause.

As an alternative to the above described embodiment the circuit unit 20 shown in FIG. 2 can be employed as a variant upon the circuit unit 13 of FIG. 1, with again only one control signal needing to be provided on data carrier 10 for each angular position at which a commutation is to occur. In addition to the switching arrangement 21 for fed current which in principle performs the same functions as described above, there is furthermore provided a delay unit 22. Delay unit 22 can, e.g., be constituted by a clock-controlled counter that is pre-set to a certain value, started by an input signal, counts with a fixed clock frequency, and, upon the insurance of an end signal, stops. The value to which the counter is pre-set is in that event advantageously adjustable.

Figure 3:
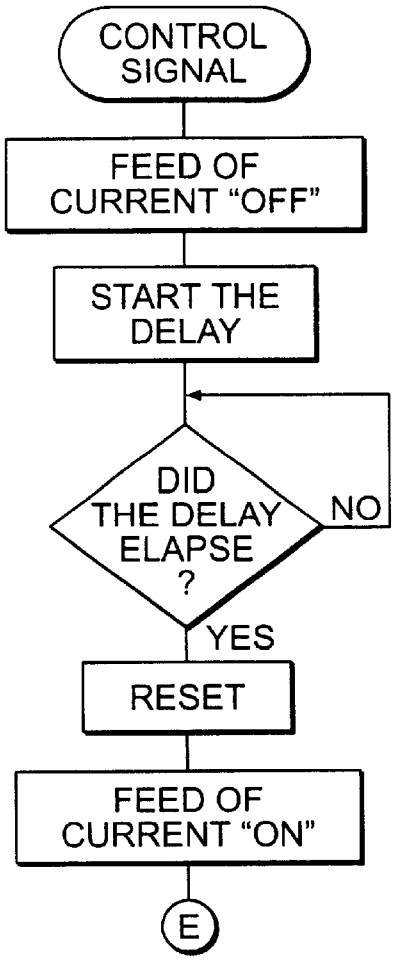
FIG. 3 is a flowchart for the circuit of FIG. 2.

As can be seen from the simplified flowchart of FIG. 3, a control signal—read from rotating data carrier 10 and transmitted, via the connection shown in lift 17, to the switching unit 21 for fed current—causes the feeding of current in the connection shown as conductor 19 to becomes switching off and the delay arrangement 22 to become started. After elapse of the pre-set delay time, delay unit 22, is reset to its starting setting, and an output signal is transmitted to the switching circuit 21 for fed current, which latter thereupon establishes a feed of energizing current to the next-following winding coil of motor 1. In this exemplary embodiment, the magnitude of the current pause between the switching-off and renewed switching-on of the energizing current for the winding is accordingly determined by the delay unit 22.

In the case of the exemplary embodiments described up to this point regulating circuits such as known and used in the prior art can of course be connected in the current-supply circuit of the motor, the regulating circuit implementing a constant rpm by adjusting, for example, the amplitude of the energizing current pulses.

Figure 4:
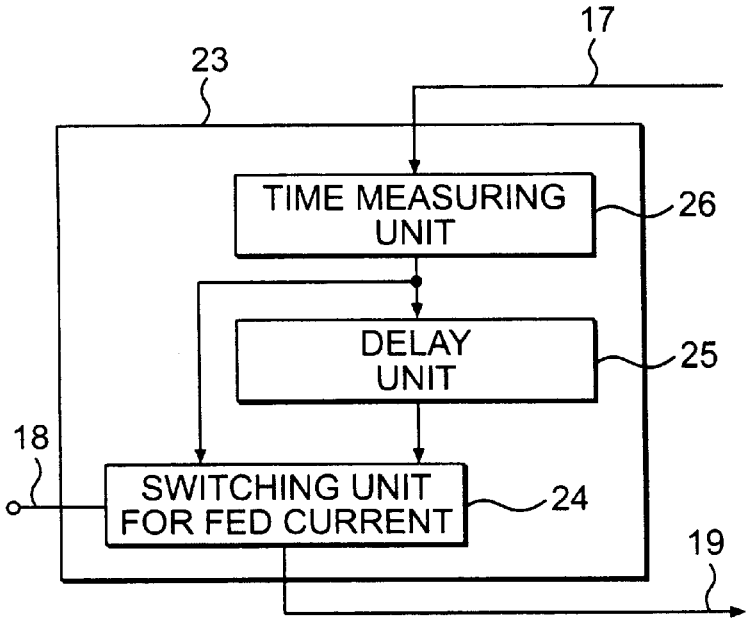
FIG. 4 depicts a further exemplary form for the circuit configuration of FIG. 1.
Figure 5:
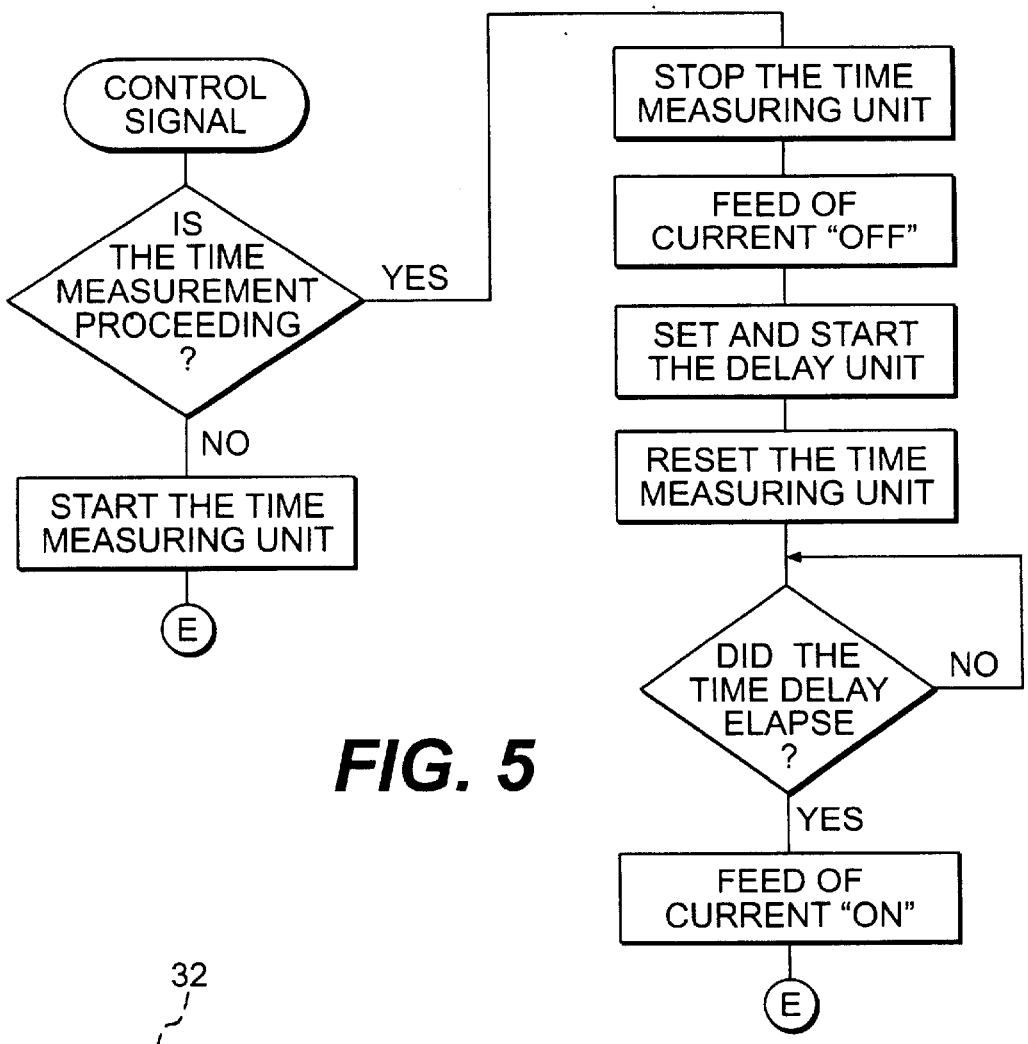
FIG. 5 is a flowchart pertaining to the circuit configuration of FIG. 4.

The circuit unit 23 of FIG. 4, besides a switching unit 24 for fed current and a delay unit 25, furthermore comprises e time-measuring unit 26, which likewise can be formed by a counter which is started by a first input signal and, beginning from zero, counts upward with a fixed clock frequency, until the counting operation is ended by a second input signal. For each switchover-operation the data carrier 10 has two control signals which are spaced from each other and are, via the connection represented by line 171, transmitted from the read head 16 to the time-measuring unit 26 to be input signals to the latter. According in the simplified flow-chart of FIG. 5, the arrival of the first one of such a pair of control signals has the effect that the time-measuring arrangement 26 because started. The second control signal, arriving at the now counting time-measuring unit 26, stops the time-measuring operation and causes the switching unit 24 for fed current to interrupt the flow or energizing current along conductor 19 to the winding of motor 1. Simultaneously, the measured time value is transmitted from the time-measuring unit 26 to the time-delay unit 25, whose delay time value is decreased by the amount of the measured time value. If a counter is used to the delay unit 25, a base value to which the summer becomes set would exceedingly be decreased by the amount of the measured time value. If the delay unit 25 set and started with the correction value is reached at the end of the delay time, then a signal is transmitted to the switching unit 24 for fed current, whereupon flow of energizing current is initiated for the next-following winding coil of the d.c. motor 1. With the configuration of this exemplary embodiment, a very quick rpm regulation is thus implemented using only two signals for each angular position at which a commutation is to occur; due to the relatively large diameter of data carrier 10 a speed measurement, achieved by measuring the length of a distance, can be had over an angular distance of only small extent. The first control signal of each such pair is provided to initiate the measuring operation, whereas the second control signal initiates the commutation. The current pause, which is dependent upon the deviation of the measured rpm from the desired rpm is, in contrast, determined by the delay unit 25.

Figure 6:
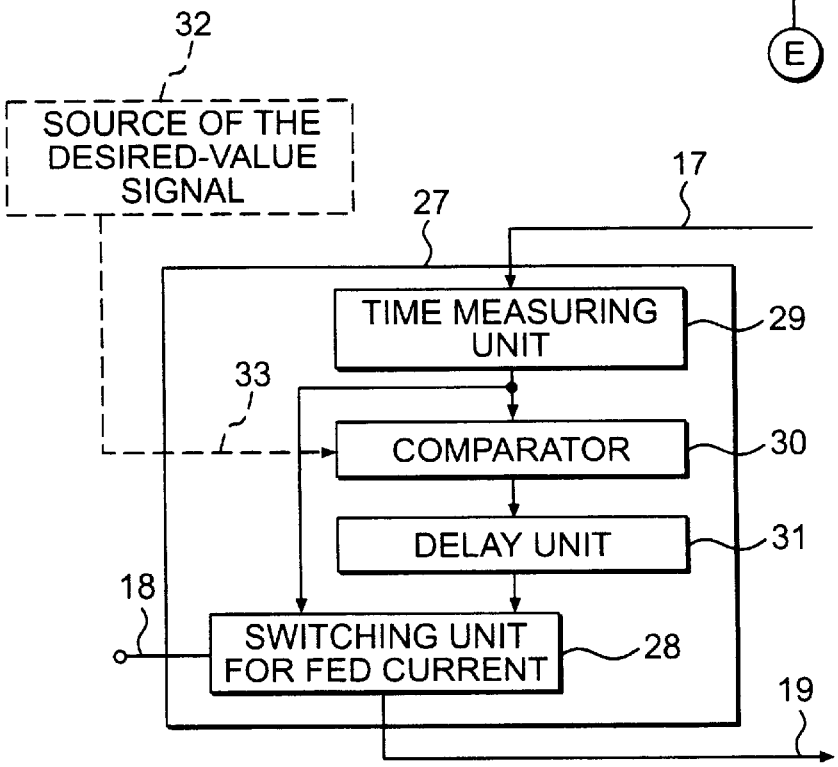
FIG. 6 depicts a further exemplary form for the circuit configuration of FIG. 1.
Figure 7:
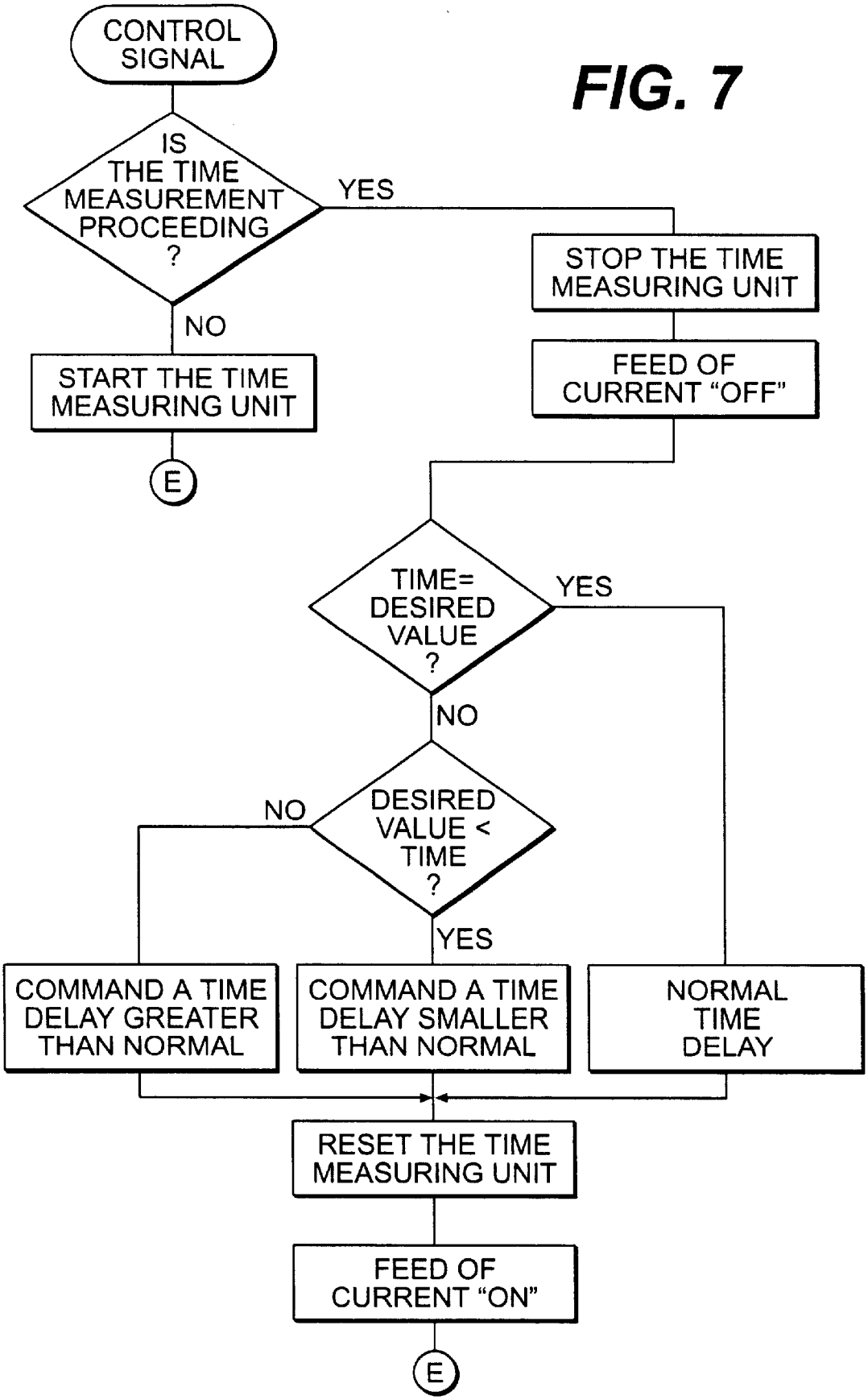
FIG. 7 is a flowchart pertaining to the circuit configuration of FIG. 6.

The exemplary embodiment of FIG. 6 offers a still more convenient solution, whom manner of operation is explained in connection with the simplified flowchart of FIG. 7. The circuit unit 27, besides remaining a switching unit 28 for fed current and a time-measuring unit 29, further comprises a comparator 30 and a delay unit 31 with several different delay times or a variable delay time. For such purpose there can be provided a tabulation having individually addressable, differing delay values which one be used to set a counter in the manner described further above. Comparator 30 furnishes a reference or desired value, which can be fixedly pre-set, or else can receive such a value at a desired-value signal input 33 from a source 32 that is provided with a set of desired-value or preset value data. In this exemplary embodiment too, for each angular position at which a commutation is to occur, there are arranged on the storage track 15 or data artier 10 two mutually spaced control signals, read one after the other by read head 16 when data carrier 10 is rotating.

As already described above in connection with FIGS. 4 and 3. In each instance the first one of a pair of control signals starts the time-measuring unit 29, whereas the second control signal causes the time measuring unit 29 to again stop (FIG. 7). The ending of the time measurement causes a signal to be transmitted to the switching unit 28 for fed current, which latter thereupon interrupts the feeding of current to the motor winding. The value determined by the time-measuring unit 29 is transmitted to comparator 30, which compares it against the desired value. The result of the comparison is transmitted to delay unit 31 and constitutes a criterion for the selection of a pulse pause of suitable magnitude between the interruption and re-establishment of flow of energizing current to the winding, for example constituting an address for a delay-times tabulation. If for example the result of the comparison indicates a deviation, from the desired value such that the desired value is smaller than the values measured by the time-measuring unit 29, then the delay unit 31 must generate a time value for the pulse pause correspondingly below the normal pulse-pause duration, in order in that way a increase the pulse breadth of the energizing pulses for the winding and accelerate the too-slowly-turning rotor 7 of motor the opposite situation i.e. when the result of the comparison indicates a deviation from the desired value such that the desired value exceeds the measured value, the delay unit 31 must correspondingly generate a time value for a longer pulse, in order in that way to decrease the pulse breadth of the energizing pulses for the winding and decelerate the too-fast-turning rotor 7 of motor 1 pause. Subsequent to the selection of the deviation-dependent time-delay, or after elapse thereof, the time-measuring unit 29 is again brought to its starting settling; and, by means of the switching unit 29 for fed current, flow of energizing current is established for the coil of stator winding 2 that is next in the energization estimates.

Establishment of a desired value (for example taken from a tabulation of desired value, or else computable) makes possible open-loop or closed-loop control of the rpm of the motor and data carrier in accordance with desired speed profiles, e.g. to implement a desired acceleration behavior or braking behavior. Furthermore, depending upon the stringency of the requirement of a particular situation, a more or less complicated configuration of the delay unit 31 can be used to establish and a dimensionally coarse or very fine correction of speed deviation, implemented on the basis of a short angular distance and performed immediately. Instead of varying the pulse pause to the energization of the winding, it is of course also possible to have the amplitude of the energizing pulses be varied in corrective fashion or, in the event of successions of energizing pulses produced by some keying method, to have the number of individual pulses per cycle of energization of the winding be varied in corrective fashion.

The described exemplary embodiments indicate only a small selection of the possibilities opened up by one concepts of the invention, which the person of routine skill can very within wide limits and adapt to special requirements or desires. For example, it is thinkable that the signal-storing track for the control signals be provided with further motor-control data, such as perhaps a direction-of-rotation indication. For a more complex motor control system, even a second data storage track, or yet further tracks, could be utilized. Finally, for the motor-control action, the storage track, or the control signals thereon, can even be encoded with unmeasured value.

Also, it is not absolutely necessary to provide two separate write and/or read heads for the control signals and the data signals or to provide the control signals on a concentric data track. On the contrary, for the person of routine skill, it is self-evident that one single read/write head can, in each instance at the correct moment in time, seek out the actual data track; or that, when writing data in accordance with any particular data-formatting scheme, the motor-operation control signals, too, and in correspondence therewith, are written at another location and arranged in some other manner.

Also, the following should additionally be mentioned: It may be that the data storage device has its flow of data controlled and/or evaluated by means of a microcomputer. In that event, the functions of the circuitry required for implementation of the concepts of the invention are advantageously performed by the microcomputer of the data storage device, so that a further cost animation results.

I claim:

1. A rotary drive for rotating [a] *an optical* data carrier, comprising a brushless direct current motor with a permanent magnet rotor[;] *and* a wound stator having at least one winding coil;

a circuit arrangement for activation the *winding* coil to generate a magnetic field for producing rotary movement in the rotor;

*optical* sensing means for reading signals recorded on the *optical* data carrier, the output of the *optical* sensing means being connected to the circuit arrangement for activating the winding, and the *optical* data carrier having control signals which identify at least those angular positions of the rotor relative to the stator at which commutation of current fed to the winding cod is to the initiated.

2. A drive as claimed in claim 1, wherein the *optical* data carrier has first and second control signals for each commutation angular position and the circuit arrangement can be induced to activate the winding by a first control signal to interrupt the fed correct to the winding coil currently being energized, and by a subsequent second control signal for switching the current through an the next winding coil in an energizing sequence.

3. A drive n claimed in claim 1, further comprising delay means in the circuit arrangement and wherein, on receipt of a control signal supplied by the *optical* sensing means, the circuit arrangement for activating the winding interrupts the fed current to the energized winding coil, the delay means in the circuit arrangement is activated and, on the expiry of a delay time, the correct is switched through to the cast winding coil in an energizing sequence.

4. A drive n claimed in claim 1, wherein at least two circumferentially spaced control signals for each commutation angular position are provided on the *optical* data carrier, and the circuit arrangement further comprises a measuring device to determine the chronological interval between the two spaced control signals which follow, each other as the *optical* data carrier rotates, the measurement result of which measuring device is evaluated to control the magnitude of the current to be fed to the winding.

5. A drive as claimed in claim 6 wherein the circuit arrangement further includes a comparator to determine the deviation from a preset value, and a delay device with varying or variable delay times, wherein a delay time of a magnitude commensurate the deviation from the present value can be initiated by the circuit arrangement between the interruption of the fed current to the energized winding coil and energization of the next winding coil in an energizing sequence.

6. A drive a claimed in claim 4 wherein the circuit arrangement further includes a comparator to determine the deviation from a preset value, wherein in accordance with the deviation from the preset value, the circuit arrangement switches through a current pulse of increased or decreased current pulse breadth to the next winding coil in an energizing sequence.

7. A drive as claimed in [any one of the preceding claims] *claim 1*, wherein the *optical* sensing means includes respective *optical* write/read heads for the motor control signals and for the data signals to be written onto or read from the *optical* data carrier.

8. A drive as claimed in any our of claims 1–[6]7, wherein one control signals are located on a concentric storage track of the *optical* data carrier.

9. A drive as claimed in claim 8, wherein the storage track is a radially outer track of the *optical* data carrier.

*10. A data storage device, comprising:*

*a non-magnetic movable data storage medium;*

*a brushless direct current motor with a permanent magnet rotor and a wound stator having at least one winding coil for conducting current pulses to generate a magnetic field for producing rotary movement of the rotor;*

*a data sensing means for reading data signals recorded on the data storage medium, the data signals including control data signals which identify at least those angular positions of the rotor relative to the stator at which commutation of current pulses conducted by the winding coil is to be initiated, said control data signals remaining in permanently fixed angular locations on said data storage medium relative to said rotor; and*

*a circuit operating to feed current pulses to said winding coil to rotate said rotor and to produce and separate the current pulses in response to said control data signals read from said data storage medium, said circuit being connected to the output of said data sensing means.*

*11. The data storage device of claim 10, wherein the data storage medium has first and second control signals for each commutation angular position and the circuit arrangement can be induced to activate the winding by a first control signal to interrupt the fed current to the winding coil currently being energized and by a subsequent second control signal for switching the current through to the next winding coil in an energizing sequence.*

*12. The data storage device of claim 10, further comprising delay means in the circuit and wherein, on receipt of a control signal supplied by the sensing means the circuit for activating the winding interrupts the fed current to the energized winding coil the delay means in the circuit is activated and, on the expiry of a delay time, the current is switched through to the next winding coil in an energizing sequence.*

*13. The data storage device of claim 10, wherein at least two circumferentially spaced control data signals for each commutation angular position are provided on the data storage medium, and the circuit further comprises a measuring device to determine the chronological interval between the two spaced control data signals which follow each other as the data storage medium rotates, the measurement result of which measuring device is evaluated to control the magnitude of the current to be fed to the winding.*

*14. The data storage device of claim 13, wherein the circuit further includes a comparator to determine the deviation from a preset value, and a delay device with varying or variable delay times, wherein a delay time of a magnitude commensurate with the deviation from the preset value can be initiated by the circuit between the interruption of the fed current to the energized winding coil and energization of the next winding coil in an energizing sequence.*

*15. The data storage device of claim 13, wherein the circuit further includes a comparator to determine the deviation from a preset value, wherein in accordance with the deviation from the preset value, the circuit switches through a current pulse of increased or decreased current pulse breadth to the next winding coil in an energizing sequence.*

*16. The data storage device of claim 10, wherein the sensing means includes respective read/write heads for the motor control data signals and for the data signals to be written onto or read from the data storage medium.*

*17. The data storage device of claims 10, 11, 12, 13, 14, 15, or 16, wherein the control data signals are located on a concentric storage track of the data storage medium.*

*18. The data storage device of claim 17, wherein the storage track is a radially outer track of the data storage medium.*

* * * * *

UNITED STATES PATENT AND TRADEMARK OFFICE

CERTIFICATE OF CORRECTION

PATENT NO. : RE 38,264 E
DATED : October 7, 2003
INVENTOR(S) : Helmut Hans

It is certified that error appears in the above-identified patent and that said Letters Patent is hereby corrected as shown below:

Column 6,
Line 56, “cod” should read -- coil --;
Line 57, “the” should read -- be --.
Line 62, “correct” should read -- current --.
Line 66, “n claimed” should read -- as claimed --;

Column 7,
Line 5, “correct” should read -- current --.
Line 7, “n claimed” should read -- as claimed --.
Line 16, “claim 6” should read -- claim 4 --.
Line 25, “a claimed” should read -- as claimed --.

Signed and Sealed this

Sixteenth Day of March, 2004

JON W. DUDAS
*Acting Director of the United States Patent and Trademark Office*